United States Patent [19]

Thompson

[11] 4,103,322
[45] Jul. 25, 1978

[54] LIGHTING DEVICE

[76] Inventor: Gerald Price Thompson, 3509 W. Lyndale, Chicago, Ill. 60647

[21] Appl. No.: 727,258

[22] Filed: Sep. 27, 1976

[51] Int. Cl.² .................... F21V 33/00; F21V 29/00
[52] U.S. Cl. .............................. 362/101; 362/318; 362/294
[58] Field of Search ............ 240/2 LC, 23, 39, 10.1, 240/41.35 E, 26, 46.59, 3.1; 119/5; 362/101, 318, 293, 294, 269, 267, 373, 35, 96

[56] References Cited
U.S. PATENT DOCUMENTS

| 2,301,419 | 11/1942 | Lew | 240/3.1 X |
| 2,761,959 | 9/1956 | Kunins | 240/46.59 X |
| 3,857,366 | 12/1974 | Willinger | 240/2 LC X |

Primary Examiner—J D Miller
Assistant Examiner—Peter S. Wong
Attorney, Agent, or Firm—Vogel, Dithmar, Stotland, Stratman & Levy

[57] ABSTRACT

A device for illuminating fish tanks or the like in which a source of light positioned over the fish tank is surrounded with light absorbent material to prevent unwanted reflection or refractions and is provided with a filter which specifies the color of the illuminating light. The fish tank water is illuminated with a single color light free of unwanted refractions or reflections to muddy the color.

The device includes a masking cylinder housing the light which prevents all unwanted reflections and refractions and filter cylinder movable with respect to the masking cylinder to provide a variety of color possibilities.

3 Claims, 4 Drawing Figures

LIGHTING DEVICE

BACKGROUND OF THE INVENTION

It is often desirable to illuminate fish tanks and the like with lights of different color. However, it had been found that using more than one color at a time results not in a visually pleasing effect, but rather in a muddied or murky color that is not pleasing. Accordingly, it is desirable to provide light of a single color to fish tanks. It is also desirable to provide a device in which it is possible to alter the color of the illuminating light, thereby to change the visual effect in the fish tank. Rapid changing of the colors is to be avoided for this adversely effects the spawning cycle of fish in the tank.

Prior art devices known to the inventor which provide light of different colors to fish tanks suffer from extreme unwanted reflection and refraction of light having the different colors thereby creating a muddy or murky effect in the fish tank. The device of the present invention is designed to reduce to a minimum all unwanted reflection and refraction, thereby to produce a relatively pure single color effect in the fish tank.

SUMMARY OF THE INVENTION

This invention pertains to a device for providing a light to a fish tank or the like having a single color which is clear and is not muddied or otherwise adversely affected by refraction or reflection of light having other colors, and more particularly, to a device which provides a relatively pure light having a single color selected from a plurality of colors.

It is a principal object of the present invention to provide a device providing single color lighting to a fish tank or the like, the device comprising an enclosure containing a light source, masking means for restricting the escape of light from the enclosure to a predetermined area and for absorbing reflected or refracted light, filter means having an area at least as large as said predetermined area associated with said masking means such that light escaping the enclosure passes through the filter means, and means for mounting the enclosure on the top of a fish tank or the like with the predetermined area in registry with the top of the tank, whereby activation of the light source results in light having a single color corresponding to the color of the filter means shining into the fish tank to provide a color effect to water contained therein without reflected or refracted light comingling with the single color to alter same.

Another object of the present invention is to provide a device of the type set forth, in which cooling means are provided to ensure a continuous supply of cool air to the light source, thereby extending the life thereof.

These and other objects of the present invention may be more readily understood when considered in conjunction with the detailed description and the drawings, in which:

DESCRIPTION OF THE PREFERRED EMBODIMENT

Figure 1:
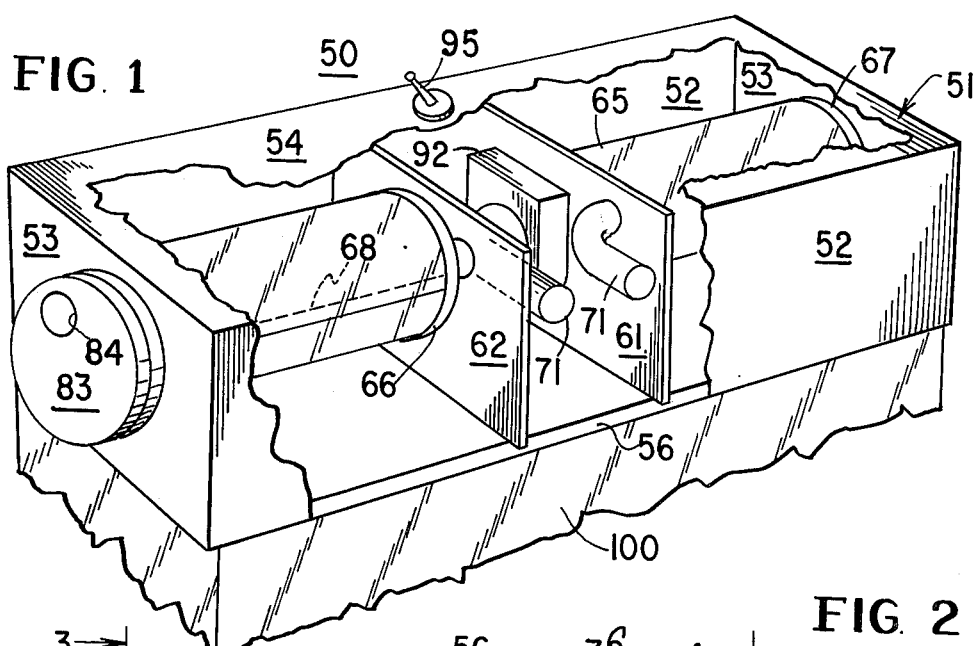
FIG. 1 is a perspective view of the device of the present invention partly broken away to show the inside thereof located on top of a fish tank.

Referring to the drawings, there is disclosed a device 50 including a housing 51 comprised of spaced apart and opposed parallel rectangular side walls 52 interconnected by end walls 53 and a top wall 54. Each end wall 53 is provided with a central aperture 55 for a purpose to be described. Inturned flanges 56 extend along the bottom edge of each side wall 52 parallel to the top wall 54 and inturned flanges 57 extend along the end walls 53 parallel to the top wall 54 and perpendicular to each of the side flanges 56. Spaced apart mounting boards 61 and 62 extend transversely of the longitudinal axis of the housing 51 interconnecting the side walls 52. Each of the mounting boards 61 and 62 is fixedly secured to the side wall 52, the top wall 54 and the flanges 56 by any suitable means depending upon the material employed. Since two lighting units are illustrated, only one will be described in detail for brevity, it being understood that a plurality of such units may be used if desired, depending on the longitudinal extent of the device 50.

An inner or masking cylinder 65 has two ends 66 and 67 which are respectively mounted to the mounting board 61 and the end wall 53. Mounting is by adhesive 69 or welding if metal is used. Other mounting means 69 may also be used provided that it is light-tight. The end 66 forms a light-tight union with the mounting board 61 and the end 67 is secured to the end wall 53 in registry with the aperture 55 therein, the aperture 55 having a diameter equal to the inner diameter of the cylinder 65. A longitudinally extending slot 68 extends intermediate the end caps 66 and 67, which end slot preferably has an arcuate extent of 90° or less. The union surface of cylinder 65 is provided with a light-absorbent material, such as black paint.

An air tube 71 interconnects the outside of the device 50 with the inside of the inner tube 65 by providing an air flow path from outside the side wall 52 through the end cap 66 and into the inside of the cylinder 65. Preferably, the tube 71 has its intake end 72 perpendicular to the longitudinal axis of the cylinder 65 thereby requiring a 90° bend in the tube 71, for a purpose hereinafter set forth.

There is a filter cylinder 75 having an outer diameter slightly less than the inner diameter of the masking cylinder 65 to provide frictional engagement therebetween. The cylinder 75 has end caps 76 and 77 respectively, corresponding to any caps 66 and 67 with the proviso that the end cap 77 extend outside of the housing 51 by an amount equal to the external portion 79 of the cylinder 75. It is seen therefore, that cylinder 75 fits inside of cylinder 65 and frictionally engages same, the longitudinal extent of cylinder 75 being greater than that of cylinder 65.

The end cap 77 has provided therein four apertures 78a, 78b, 78c and 78d, located at 90° arcuate intervals each being of a sufficient size to conduct a volumn of air therethrough. An opaque cap 83 having an aperture 84 at least as large as one of the apertures 78 frictionally fits over the cap 77 of the filter cylinder 75. Alignment of aperture 84 with one of apertures 78(a)-(d), provides an air outlet to cylinders 65 and 75, while the opaque cap 83 prevents unwanted light from entering the cylinders.

Figure 2:
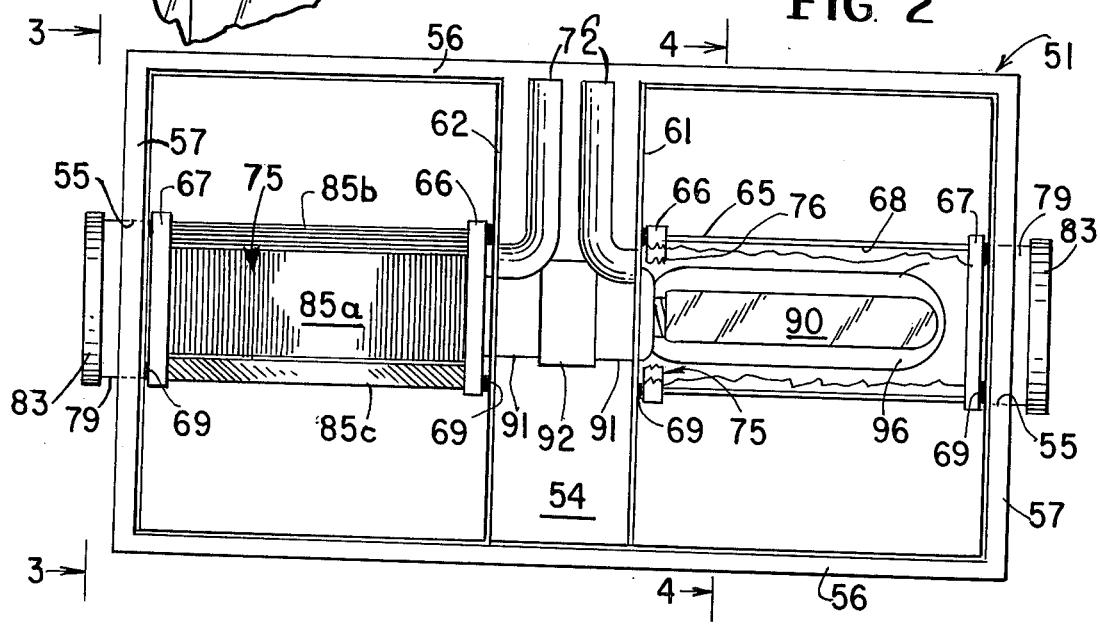
FIG. 2 is a plan view of the device shown in FIG. 1 viewed from the bottom of the device.
Figure 3:
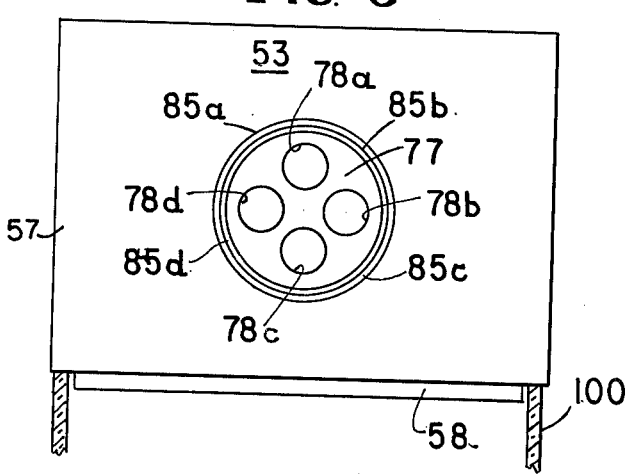
FIG. 3 is a view in section of the device illustrated in FIG. 2 taken along line 3-3.
Figure 4:
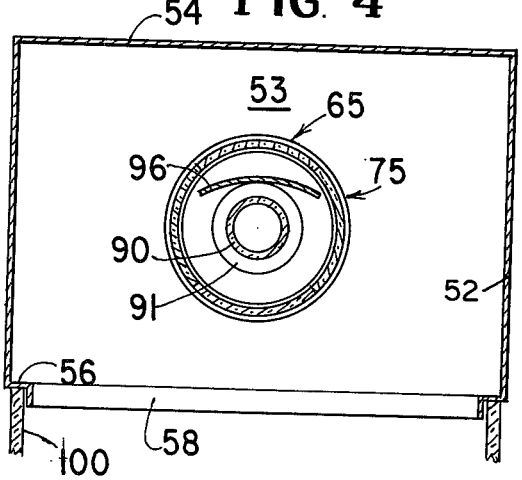
FIG. 4 is a view in section of the device illustrated in FIG. 2 taken along line 4-4.

The filter cylinder 75 is divided roughly into four equal arcuate sections each accommodating a different color filter 85. Accordingly, there are four different colored filters 85 corresponding to one of the letters (a) through (d) seen in FIGS. 2 and 3 of the drawings. For instance, 85a represents a red color filter and 85b a blue color filter and 85c a green color filter and 85d a clear color filter. The filters 85a through 85d are included in the body of the filter cylinder 75 or may form the entire cylinder or a substantial portion thereof. It is required that the arcuate extent of each of the filters 85a through 85d, be larger than the arcuate extent of the slot 68 in the masking cylinder 65.

A light bulb 90 which may be flourescent or of the grow type, is mounted in a socket 91 which is in turn connected to a central starter 92 in electrical communication with a switch 95. The socket 91 and starter 92 are so interconnected to provide a stationary mounting for the bulb 90 and also one which while extending through the mounting board 61 is light-tight. A reflector or shield 96 is positioned above the bulb 90 preferably mounted to the socket 91. The entire device 50 is adapted to sit atop a fish tank 100 so that activation of the light bulb 90 results in light passing through the slot 68 in the masking cylinder 65 and through one of the filters 85(a)-(d) in the filter cylinder 75 in registry therewith downwardly into the tank 100.

Because the light 90 is within an enclosed container 65 with the exception of the slot 68 through which light may be emitted into the fish tank 100 and because the inside of the cylinder 65 is light absorbent there is no reflected or refracted light which can muddy the color of the light being transmitted through one of the filters 85(a) through (d). Choice of colors is readily made by turning the cap 77 and thereby the inner cylinder 75 with respect to the slot 68 to present any one of the various filters 85(a) through (d). At all times, only the single chosen filter 85(a)-(d) is in registry with the slot 68 through which light is transmitted and accordingly, light of only one color enters the fish tank. By providing the light absorbent surface of cylinder 65 in combination with the closed system heretofore disclosed, all unwanted reflection and refraction is eliminated.

Light bulbs 90 of the type herein discussed, may have the life span severely reduced by heat build-up and to that end, there is provided an air flow path to cool the bulb sufficiently to extend the life thereof significantly. The air tube 71 having an intake end 72 thereof in communication with a source of cool air provides an air flow path to the inside of the cylinder 65, and the aperture 84 in the end cap 83 in combination with the four apertures in the end cap 77 insure an air flow path from the intake end 72 of the air tube 71 pass the light bulb 90 and out of the cylinder 75. By maintaining the aperture 84 at an elevation higher than the intake end 72 of the air tube 71, air heated in the cylinder 65 due to the light bulb 90 will rise and exit through the aperture 84, thereby creating a vacuum which pulls cool air into the cylinder 65 through the intake 72. It is seen, therefore, there has been provided a cooling mechanism to prolong the life span of the bulb 90.

It is contemplated that changes in color of the light transmitted to the fish tank be made by manual rotation of the cylinder 75 with respect to the cylinder 65, but it is within the scope of the present invention that this action be motorized. However, continuous changing of the color of the light transmitted to the fish tank 100, may deleteriously effect spawning of the fish in the tank; however, rapid changing of the color over a short period of time should not adversely effect the fish. Although the present device has been described with four different colored filters, it should be readily appreciated that filters of different color or different numbers may be provided without deviating from the spirit of the present invention. Also, it is clear that the containers of different shape other than the cylinders disclosed may also be provided, the cylinder being the easiest to operate and thereby the preferred embodiment. Since some fish tanks may be over four feet long, multiple combined units such as that illustrated in the drawings may be used. For smaller tanks a single unit corresponding to one half of the unit illustrated may be employed.

While there has been described what at present to be considered the preferred embodiment of the present invention, it will be appreciated that various modifications and alterations may be made therein without departing from the true spirit and scope of the present invention and it is intended to cover in the appended claims all such alterations and modifications.

What is claimed is:

1. A device providing single color lighting to a fish tank or the like, said device comprising a cylindrical enclosure containing a light source and having an angular air inlet tube at one end thereof and an air outlet at the other end thereof, each of said air inlet and outlet being constructed to restrict light from entering said enclosure with said air outlet being at an elevation higher than said air inlet, masking means for restricting the escape of light from said enclosure to a predetermined area and for absorbing reflected or refracted light, filter means having an area at least as large as said predetermined area associated with said masking means that said light escaping said enclosure passes through said filter means, and means for mounting said enclosure on the top of a fish tank or the like with said predetermined area in registry with the top of the tank, whereby activation of said light source results in light having a single color corresponding to the color of said filter means shining into the fish tank to provide a color effect to water contained therein without reflected or refracted light comingling with said single color to alter same.

2. The device set forth in claim 1, wherein said filter means is a cylinder, with the inner diameter of said enclosure cylinder being only slightly larger than the outer diameter of the filter cylinder to provide a frictional engagement therebetween.

3. The device set forth in claim 2, wherein said mounting means is a rectangular housing having said cylinders mounted therein.

* * * * *